US012537832B2

(12) United States Patent
Tashiro et al.

(10) Patent No.: US 12,537,832 B2
(45) Date of Patent: Jan. 27, 2026

(54) ON-VEHICLE COMMUNICATION LINE CONNECTION APPARATUS

(71) Applicant: YAZAKI CORPORATION, Tokyo (JP)

(72) Inventors: Hiromu Tashiro, Susono (JP); You Yanagida, Susono (JP); Akiyoshi Kanazawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 26 days.

(21) Appl. No.: 18/764,646

(22) Filed: Jul. 5, 2024

(65) Prior Publication Data

US 2024/0364714 A1 Oct. 31, 2024

Related U.S. Application Data

(63) Continuation of application No. PCT/JP2023/005605, filed on Feb. 16, 2023.

(30) Foreign Application Priority Data

Feb. 21, 2022 (JP) ................................ 2022-025049

(51) Int. Cl.
| | |
|---|---|
| *H04L 9/40* | (2022.01) |
| *B60R 16/023* | (2006.01) |
| *H02G 3/16* | (2006.01) |
| *H04L 12/28* | (2006.01) |
| *H04L 12/40* | (2006.01) |

(52) U.S. Cl.
CPC ........ *H04L 63/1416* (2013.01); *B60R 16/023* (2013.01); *H02G 3/16* (2013.01); *H04L 12/28* (2013.01); *H04L 12/40006* (2013.01); *H04L 2012/40215* (2013.01); *H04L 2012/40273* (2013.01)

(58) Field of Classification Search
CPC . H04L 2012/40215; H04L 2012/40273; H04L 63/1416; H04L 12/28; H04L 12/40006; H02G 3/16; B60R 16/023
See application file for complete search history.

(56) References Cited

U.S. PATENT DOCUMENTS

| | | | | |
|---|---|---|---|---|
| 11,630,746 B2* | 4/2023 | Ishikawa | ........... | B60W 50/0225 701/29.2 |
| 11,683,693 B1* | 6/2023 | Bayer | ...................... | G06F 8/65 455/41.2 |

(Continued)

FOREIGN PATENT DOCUMENTS

| | | |
|---|---|---|
| JP | 2018-157463 A | 10/2018 |
| JP | 2019-104488 A | 6/2019 |

(Continued)

*Primary Examiner* — Thomas J Dailey
(74) *Attorney, Agent, or Firm* — Kenealy Vaidya LLP

(57) ABSTRACT

Instead of a joint connector, a function substitution unit is attached to a position where a plurality of communication lines of systems of a wire harness are concentrated. The function substitution unit includes a plurality of terminals for connection of CAN buses of a plurality of systems, and detects and blocks an unauthorized signal sent from an unauthorized device by distinguishing a position of each terminal from a region of a path through which a CAN signal passes.

4 Claims, 13 Drawing Sheets

(56) References Cited

U.S. PATENT DOCUMENTS

| | | | |
|---|---|---|---|
| 2015/0066239 A1* | 3/2015 | Mabuchi | H04L 12/403 |
| | | | 701/1 |
| 2018/0141439 A1* | 5/2018 | Shin | B60L 3/0084 |
| 2018/0278616 A1 | 9/2018 | Sakamoto et al. | |
| 2019/0185052 A1 | 6/2019 | Yoshida et al. | |
| 2020/0145437 A1* | 5/2020 | Torisaki | H04W 12/125 |
| 2020/0213149 A1 | 7/2020 | Takeuchi et al. | |
| 2021/0258189 A1* | 8/2021 | Toyoda | H04L 12/40202 |
| 2022/0417718 A1* | 12/2022 | Yoshida | B60R 16/023 |
| 2024/0157893 A1* | 5/2024 | Isoyama | H04L 12/40 |

FOREIGN PATENT DOCUMENTS

| | | |
|---|---|---|
| JP | 2020-108132 A | 7/2020 |
| JP | 2021-163978 A | 10/2021 |

* cited by examiner

ON-VEHICLE COMMUNICATION LINE CONNECTION APPARATUS

CROSS-REFERENCE TO RELATED APPLICATIONS

This is a continuation of International Application No. PCT/JP2023/005605 filed on Feb. 16, 2023, and claims priority from Japanese Patent Application No. 2022-025049 filed on Feb. 21, 2022, the entire content of which is incorporated herein by reference.

TECHNICAL FIELD

The present disclosure relates to an on-vehicle communication line connection apparatus, and more particularly to a technique for a safety measure against connection of an unauthorized device to a communication network on a vehicle.

BACKGROUND ART

In recent years, cases of vehicle theft using a method called a CAN invader are increasing. This technique involves connecting an unauthorized device to a connector or the like of a controller area network (CAN) on a vehicle from the outside of the vehicle, and sending a signal, to a network on the vehicle side, that impersonates an authorized on-vehicle ECU or the like recognizing a signal from a smart key, causing a malfunction in an on-vehicle device.

On the other hand, for example, Patent Literature 1 discloses an electronic control system capable of enhancing a security measure in a vehicle. The electronic control system includes a CAN bus mounted on a vehicle, an ADAS control ECU that receives a vehicle state signal indicating information related to the state of the vehicle via a dedicated line, which is wiring used only for communication of the vehicle state signal, and that transmits a control instruction signal to the CAN bus based on the vehicle state signal, and an actuator ECU that receives the control instruction signal transmitted from the ADAS control ECU via the CAN bus and that executes control related to driving of the vehicle based on the control instruction signal.

CITATION LIST

Patent Literature

Patent Literature 1: JP2020-108132A

SUMMARY OF INVENTION

When the technique disclosed in Patent Literature 1 is used, communication of the vehicle state signal can be executed via the dedicated line independent of the CAN bus. That is, communication can be executed by simultaneously using the duplicated communication lines. Therefore, for example, even when an unauthorized impersonated signal is sent to the CAN bus by an unauthorized device connected to the outside of the vehicle, it is considered to be relatively easy to detect that the signal is impersonated.

However, when the technique in Patent Literature 1 is used, it is necessary to physically add a new dedicated line in addition to the present electric wires to a wire harness that connects various on-vehicle devices. Therefore, for example, when a new wire harness for a vehicle is manufactured, it is necessary to redesign the specification of the wire harness. Specifically, with the addition of the dedicated line, it is necessary to appropriately change the shape of the exterior member of the wire harness or to appropriately change the assembly order of the wire harness, which affects various locations.

When the technique in Patent Literature 1 is used as a security measure for the present vehicle, a new dedicated line needs to be physically added to the outside of the present wire harness. Therefore, various operations are required, such as routing the dedicated line, connecting the dedicated line to another circuit, and adding an exterior material to protect the dedicated line. That is, it is not actually easy to add a new dedicated line, and it is difficult to achieve a simple security measure in the present vehicle.

The present disclosure has been made in view of the above circumstances, and the object of the present disclosure is to provide an on-vehicle communication line connection apparatus that can easily prevent unauthorized intrusion into a communication network on a vehicle without adding an electric wire that greatly affects the structure of a wire harness on the vehicle.

The above object of the present disclosure is achieved by the following configuration.

An on-vehicle communication line connection apparatus including:
  a first common communication line that is routed in a first region on a vehicle, the first region being physically difficult to access by an unauthorized external device;
  a second common communication line that is at least partially routed in a second region on the vehicle, the second region being physically easy to access by a unauthorized external device;
  a common connector portion that physically connects the first common communication line and the second common communication line;
  a first connection unit that connects one or more first on-vehicle devices provided in the first region and the first common communication line;
  an upper connection unit that connects the first common communication line and an upper management unit, the upper management unit managing communication in a system higher than the first common communication line; and
  a substitute management unit that is provided inside or near the common connector portion and monitors at least unauthorized communication in a direction from the second common communication line toward the first common communication line,
  wherein the substitute management unit identifies at least whether or not the vehicle is in a stop state, and
  only when the vehicle is in the stop state, the substitute management unit monitors communication received from the second common communication line to identify presence or absence of unauthorized communication.

According to the on-vehicle communication line connection apparatus in the present disclosure, it is easy to prevent unauthorized intrusion into a communication network on a vehicle. Moreover, it is not necessary to add an electric wire that greatly affects the structure of a wire harness on the vehicle.

The present disclosure has been briefly described above. Further, the details of the present disclosure can be clarified by reading modes (hereinafter, referred to as "embodi-

DESCRIPTION OF EMBODIMENTS

A specific embodiment according to the present disclosure will be described below with reference to the drawings.

Figure 1:
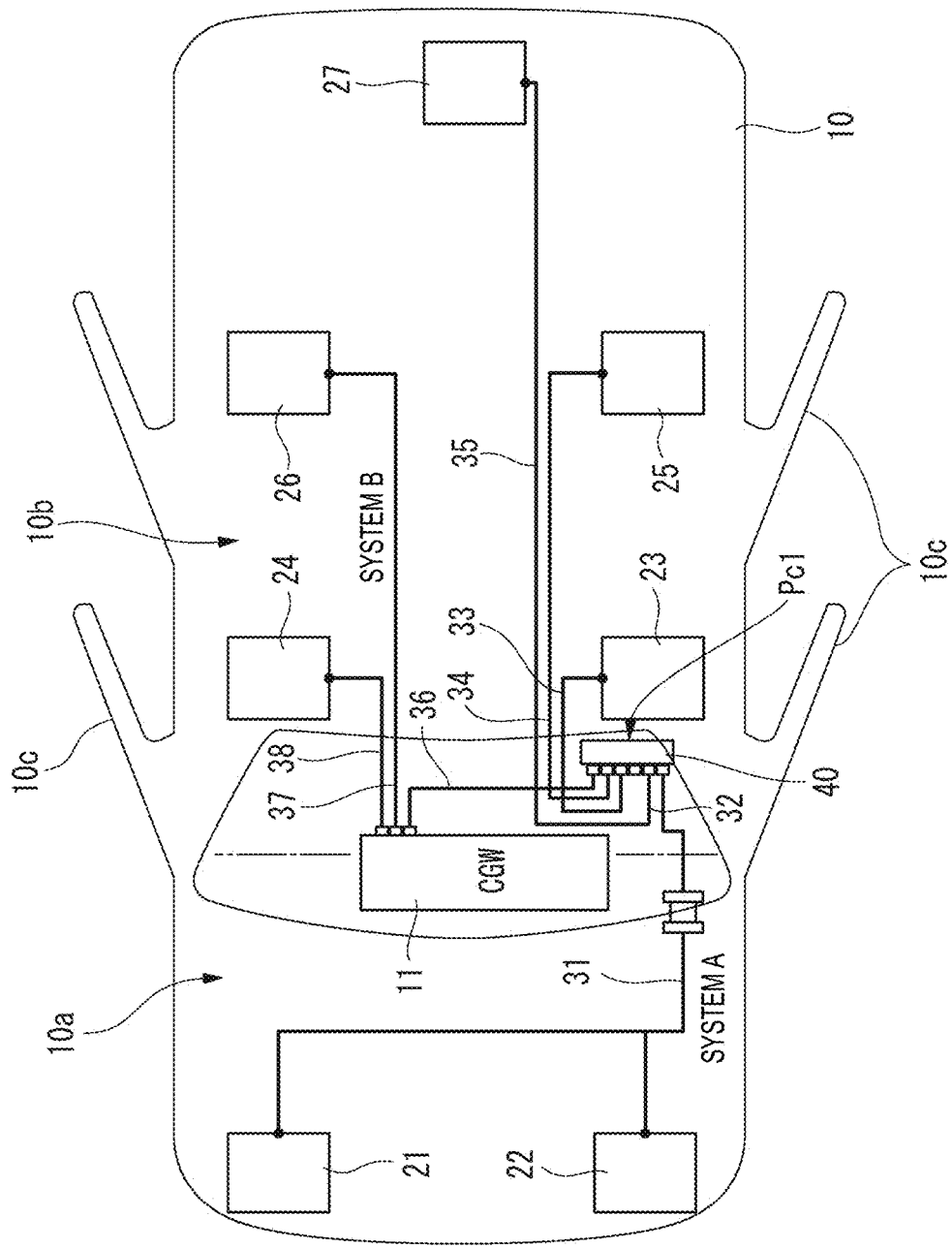
FIG. 1 is a plan view showing an arrangement example of main components on a vehicle provided with an on-vehicle communication line connection apparatus according to an embodiment.

FIG. 1 is a plan view showing an arrangement example of main components on a vehicle provided with an on-vehicle communication line connection apparatus according to an embodiment. In FIG. 1, the left side and the right side respectively indicate the front side and the rear side of a vehicle 10. In the present embodiment, the on-vehicle communication line connection apparatus is implemented as a communication system including a wire harness routed on the vehicle.

The vehicle 10 includes an engine room 10a on the front side of the vehicle body of the vehicle 10 and a vehicle compartment 10b in the center. The engine room 10a and the vehicle compartment 10b are partitioned from each other by a partition and form independent spaces. The vehicle 10 includes, in the front-rear direction, a plurality of doors 10c that can be opened and closed on the left and right sides of the vehicle compartment 10b. When the door 10c is closed and is in the locked state, unauthorized intrusion into the vehicle compartment 10b from the outside of the vehicle 10 becomes difficult.

On the other hand, the upper side of the engine room 10a is covered with a hood that can be opened and closed, and the lower side of the engine room 10a is in the open state. Therefore, it is relatively easy to connect an unauthorized device to the wire harness or the like routed in the engine room 10a. Therefore, when the vehicle is stolen by an unauthorized intruder, the device and the wire harness in the engine room 10a are likely to be an intrusion path at the time of an attack.

In the example shown in FIG. 1, a plurality of on-vehicle devices 21 and 22 are provided in the engine room 10a. The on-vehicle devices 21 and 22 in the engine room 10a are connected to the vehicle compartment 10b side via a wire harness 31.

On the other hand, a plurality of on-vehicle devices 23, 24, 25, 26, and 27 are also provided in the vehicle compartment 10b or on the luggage compartment side. A special electronic control unit (ECU) that functions as a central gateway (CGW) 11 is provided on the vehicle compartment 10b side.

The central gateway 11 enables mutual connection of communication among a plurality of systems (a body system, an ADAS system, a power training and chassis system, and the like) on the vehicle 10, and has a security function for preventing intrusion of an unauthorized signal due to communication from the outside via a wireless communication network.

In the example shown in FIG. 1, one ends of wire harnesses 33, 38, 34, 37, and 35 are connected to the on-vehicle devices 23, 24, 25, 26, and 27, respectively. The other ends of the wire harnesses 37 and 38 are connected to the central gateway 11.

In the case of an on-vehicle system having a general configuration, a connector called a joint connector (J/C) is provided at a connection position Pc1 where a plurality of wire harnesses 31, 32, 33, 34, 35, and 36 are gathered, and communication lines of the wire harnesses 31, 32, 33, 34, 35, and 36 are electrically connected in common at the connection position Pc1.

In the on-vehicle communication line connection apparatus according to the present embodiment, a function substitution unit 40 is connected to the connection position Pc1 instead of the joint connector. As will be described later, the function substitution unit 40 has a security function for preventing unauthorized intrusion from the engine room 10a side. That is, the function substitution unit 40 has a function of acting as the gateway function related to the security of a location that the central gateway 11 cannot handle.

In the example in FIG. 1, one ends of the communication lines of the plurality of wire harnesses 31 to 36 are connected to the function substitution unit 40.

Figure 2:
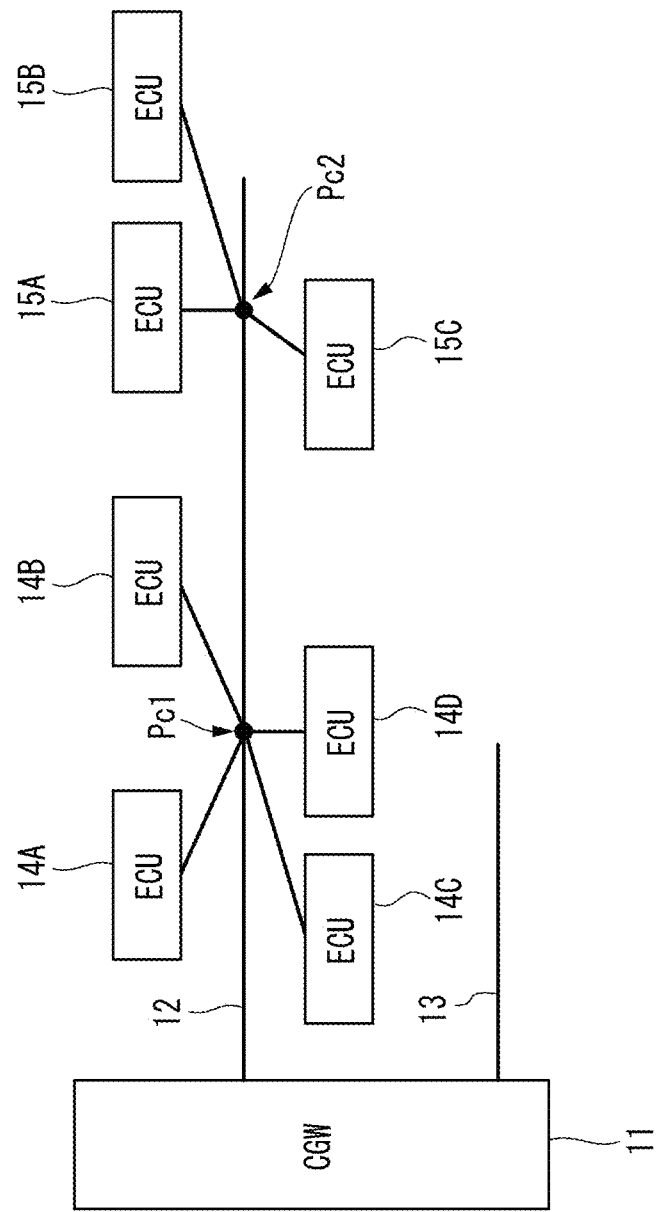
FIG. 2 is a block diagram showing a configuration example of a communication network on the vehicle.

FIG. 2 is a block diagram showing a configuration example of a communication network on the vehicle 10.

In the example shown in FIG. 2, CAN buses 12 and 13 which are common communication lines of a plurality of systems are connected to the central gateway 11. A plurality of ECUs 14A to 14D and ECUs 15A and 15C are connected to one CAN bus 12.

The CAN bus 12 can be provided in, for example, the wire harnesses 31 to 35 in FIG. 1. Each of the wire harnesses 31 to 35 typically includes one or more sets of CAN buses, power supply lines, and ground lines.

In the example shown in FIG. 2, the communication lines (the CAN buses) of the four ECUs 14A to 14D are concentrated at the connection position Pc1 and connected in common at this position. The communication lines (the CAN buses) of the three ECUs 15A to 15C are concentrated at a connection position Pc2 and are connected in common at this position. Each CAN bus is typically implemented by a pair of twisted pair wires.

For example, when a general joint connector is provided at the connection position Pc1 in FIG. 2, all the communication lines of the four ECUs 14A to 14D are connected in common, and the ECUs 14A to 14D are directly connected to the CAN bus 12.

On the other hand, when the function substitution unit 40 is provided at the connection position Pc1 as shown in FIG. 1, the CAN communication of each of the ECUs 14A to 14D is relayed by the function substitution unit 40 and then connected to the CAN bus 12.

Figure 3:
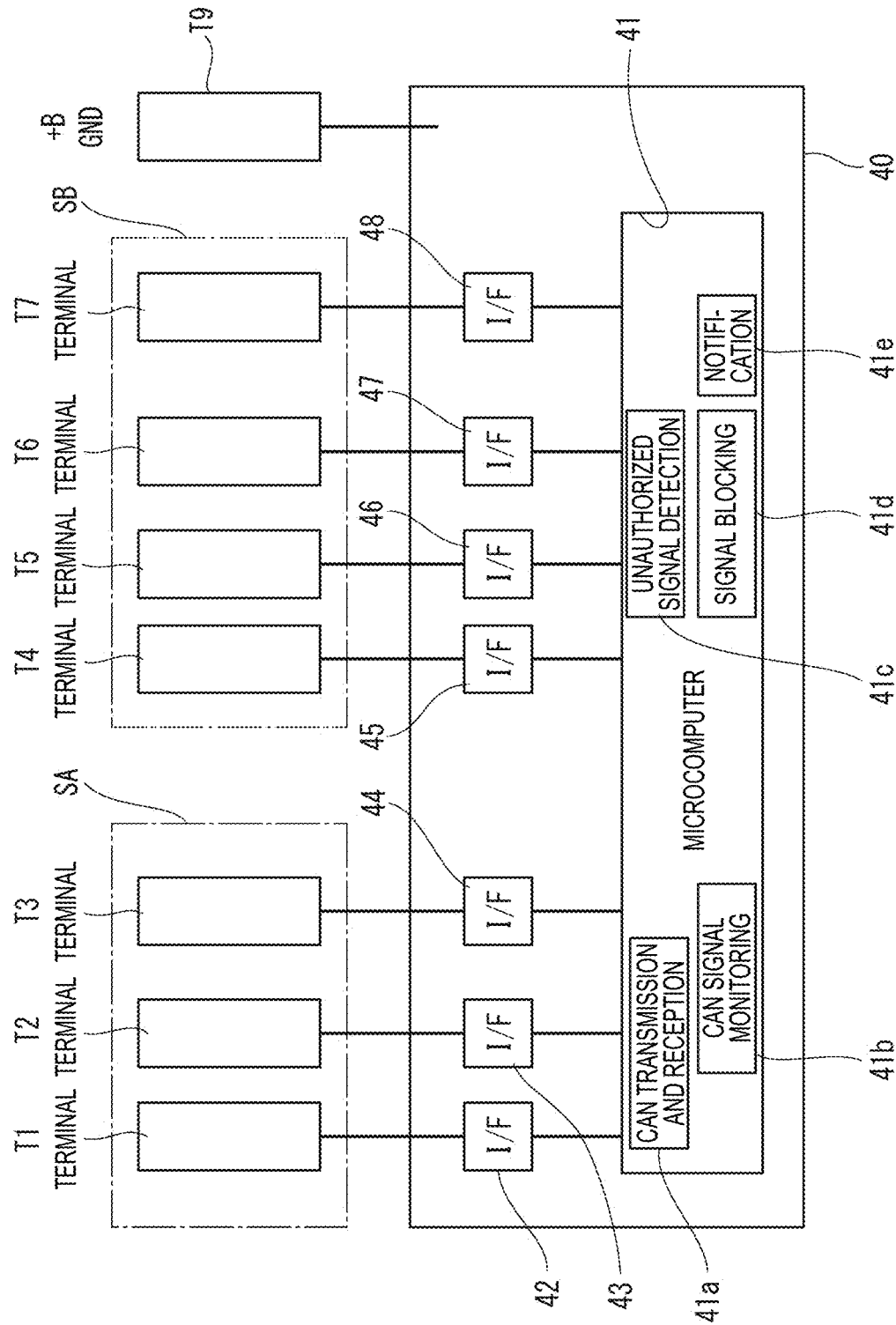
FIG. 3 is a block diagram showing a configuration example of a function substitution unit provided in the on-vehicle communication line connection apparatus according to the embodiment.

FIG. 3 is a block diagram showing a configuration example of the function substitution unit 40 provided in the on-vehicle communication line connection apparatus according to the embodiment.

In the example shown in FIG. 3, the function substitution unit 40 includes eight terminals T1, T2, T3, T4, T5, T6, T7, and T9 for connection to other circuits. The seven terminals T1 to T7 are used for connection to the CAN buses on the wire harnesses of different systems. The terminal T9 is used for connection to a power supply (+B) and the ground (GND).

In the present embodiment, the seven terminals T1 to T7 are managed by the function substitution unit 40 such that the terminals T1 to T3 belong to an A system SA, and the terminals T4 to T7 belong to a B system SB. Here, at least a part of the A system SA corresponds to the wire harness routed in the engine room 10a. The B system SB corresponds to the wire harness routed in the vehicle compartment 10b.

Therefore, for example, the wire harness 31 shown in FIG. 1 is connected to any one of the terminals T1 to T3 of the function substitution unit 40. For example, the wire harnesses 33, 34, and 36 shown in FIG. 1 are connected to any one of the terminals T4 to T7 of the function substitution unit 40.

The function substitution unit 40 includes therein a microcomputer 41 and CAN interfaces (I/Fs) 42 to 48.

The microcomputer 41 has functions of a CAN transmission and reception unit 41a, a CAN signal monitoring unit 41b, an unauthorized signal detection unit 41c, a signal blocking unit 41d, and a notification unit 41e. These functions are achieved by, for example, the microcomputer 41 executing a pre-installed program.

The CAN transmission and reception unit 41a receives the CAN signal received from each of the terminals T1 to T7, and relays the received signal as it is and sends the received signal to the other terminals T1 to T7 when there is no problem.

The CAN signal monitoring unit 41b can monitor, for each CAN signal received by the CAN transmission and reception unit 41a, the position of the input terminal, the system (SA/SB) of the input terminal, the timing of appearance, the type of the signal, the content of the signal, and the like.

Regarding the content of the signal monitored by the CAN signal monitoring unit 41b, a part of the signal frame, for example, the content of the ID field at the beginning of each signal frame alone may be subject to processing. By setting a part alone as the monitoring target, it is possible to shorten the time required for the processing inside the function substitution unit 40 and to reduce the delay in the signal sent by the function substitution unit 40, as compared with the case of checking the entire signal frame.

The unauthorized signal detection unit 41c detects, based on the monitoring state of the CAN signal monitoring unit 41b and an unauthorized signal determination condition determined in advance, an unauthorized CAN signal from among the CAN signals received by the CAN transmission and reception unit 41a. For example, the unauthorized signal detection unit 41c detects the unauthorized CAN signal sent from an impersonating device connected to the CAN bus on the vehicle 10.

When the unauthorized signal detection unit 41c detects an unauthorized CAN signal, the signal blocking unit 41d blocks the signal from being sent to the outside of the function substitution unit 40. Specifically, the CAN transmission and reception unit 41a partially blocks the function of relaying a CAN signal, thereby preventing the unauthorized CAN signal from being sent.

When the signal blocking unit 41d detects the unauthorized CAN signal, the notification unit 41e notifies the upper ECU of this information.

Figure 4:
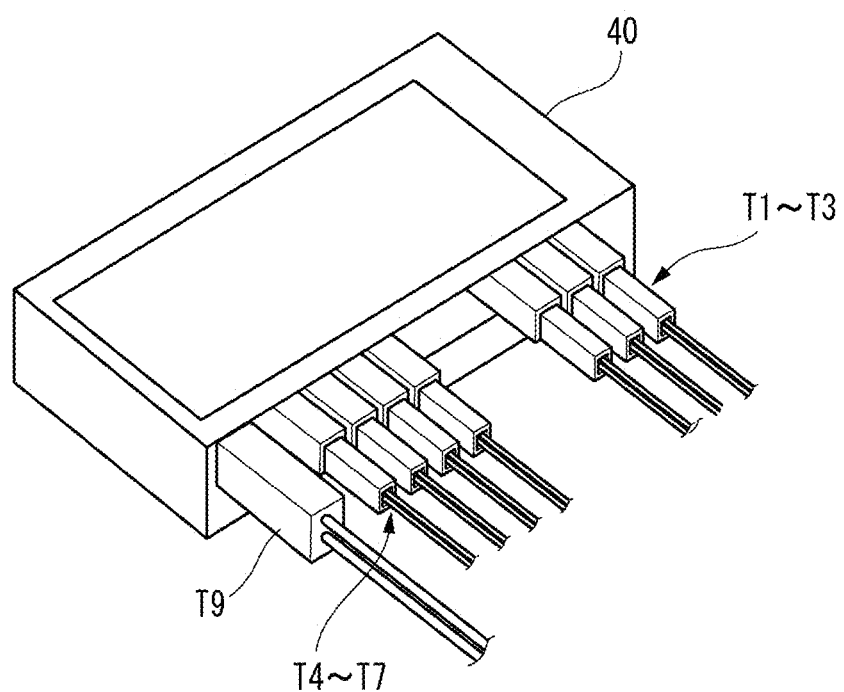
FIG. 4 is a perspective view showing an example of the external appearance of the function substitution unit.

FIG. 4 is a perspective view showing an example of the external appearance of the function substitution unit 40.

The function substitution unit 40 shown in FIG. 4 includes a connector that connects the terminals T1 to T7 and T9. Accordingly, the communication lines (twisted pair lines of the CAN bus) of the wire harnesses of the plurality of systems can be connected to any one of the terminals T1 to T7, and the power supply line of the wire harness and the ground can be connected to the terminal T9.

Accordingly, the function substitution unit 40 in FIG. 4 can be connected to the connection position Pc1 in FIG. 1 instead of a general joint connector in order to connect the wire harnesses of the plurality of systems to each other.

Figure 5:
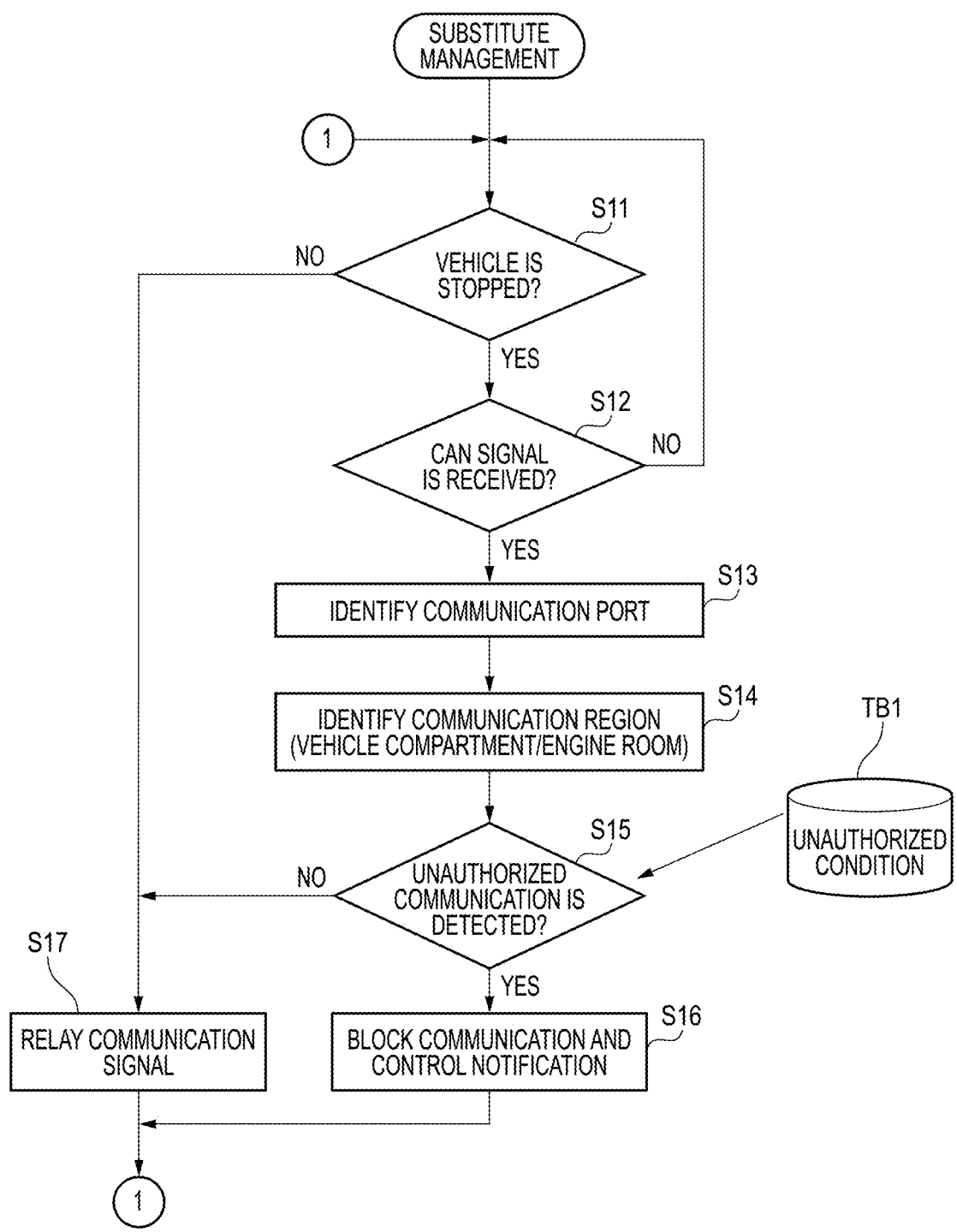
FIG. 5 is a flowchart showing the outline of control in the function substitution unit.

FIG. 5 is a flowchart showing the outline of control in the function substitution unit 40. The microcomputer 41 in the function substitution unit 40 executes control in FIG. 5. The control in FIG. 5 will be described below.

The microcomputer 41 identifies, in S11, whether the vehicle 10 is stopped, proceeds to the processing in S12 when the vehicle 10 is stopped, and proceeds to the processing in S17 when the vehicle 10 is not stopped. For example, whether the vehicle 10 is stopped can be identified by acquiring information on the traveling speed of the vehicle 10 from another ECU via the CAN bus. Of course, it is also possible to execute identification based on information other than the traveling speed.

The CAN signal monitoring unit 41b of the microcomputer 41 identifies, in S12, whether the CAN signal from another ECU is received at any of the terminals T1 to T7, and proceeds to the next processing in S13 when the CAN signal is received.

In S13, the CAN signal monitoring unit 41b identifies a communication port to which the CAN signal received from another ECU is input. That is, in S13, the CAN signal monitoring unit 41b identifies from which position of the terminals T1 to T7 the CAN signal is input to the function substitution unit 40.

In S14, the CAN signal monitoring unit 41b identifies the difference in the region of the path to which the CAN signal received from another ECU is input. Specifically, the CAN signal monitoring unit 41b discriminates CAN signals received from the terminals T1 to T3 belonging to the A system SA to which the wire harness of the path passing through the engine room 10a is connected and CAN signals received from the terminals T4 to T7 belonging to the B system SB to which the wire harness of the path not passing through the engine room 10a is connected.

The unauthorized signal detection unit 41c of the microcomputer 41 identifies, in S15, whether the received CAN signal is an unauthorized CAN signal based on the communication port identified in S13, the classification of the region identified in S14, the type and the content of the received CAN signal, the timing of reception, and the unauthorized signal determination condition determined in advance.

The unauthorized signal determination condition to be compared by the unauthorized signal detection unit 41c can be determined in advance for each terminal of the communication port and each region in consideration of the characteristics and the specifications of the authorized on-vehicle device connected to the terminal and the region, and can be individually held in an unauthorized condition table TB1.

For example, when it is assumed that the vehicle is designed such that a specific ECU having a smart key verification function is necessarily provided in the vehicle compartment 10b, a CAN signal of the type intended for smart key verification is not input to the function substitution unit 40 via the path passing through the engine room 10a. When a CAN signal deviating from such a condition is input to the function substitution unit 40, the CAN signal can be regarded as unauthorized.

The microcomputer 41 proceeds to the processing from S15 to S16 when the unauthorized signal detection unit 41c detects the unauthorized CAN signal, and proceeds to the processing in S17 if no unauthorized CAN signal is detected.

The signal blocking unit 41d of the microcomputer 41 blocks, in S16, the unauthorized CAN signal detected by the unauthorized signal detection unit 41c, and executes processing such that the unauthorized CAN signal is not output to the CAN bus on the downstream side. The notification unit 41e notifies the upper ECU that the unauthorized CAN signal is detected.

When no unauthorized CAN signal is detected, the CAN transmission and reception unit 41a relays the received CAN signal and outputs the CAN signal as it is to the CAN bus on the downstream side (S17). For example, when the CAN signal is received from the terminal T1 to the function substitution unit 40, the same CAN signal as the input generated by the relay is output to each of the other terminals T2 to T7. Alternatively, in a situation in which the security is particularly important, the CAN signal can be sent only to a necessary location among the terminals T2 to T7 depending on the destination designated for each signal.

Next, a configuration example and an operation example of the communication network using the joint connector and the communication network of the on-vehicle communication line connection apparatus according to the embodiment will be described.

<Communication Network Using Joint Connector>
<Case of Normal Operation>

Figure 6:
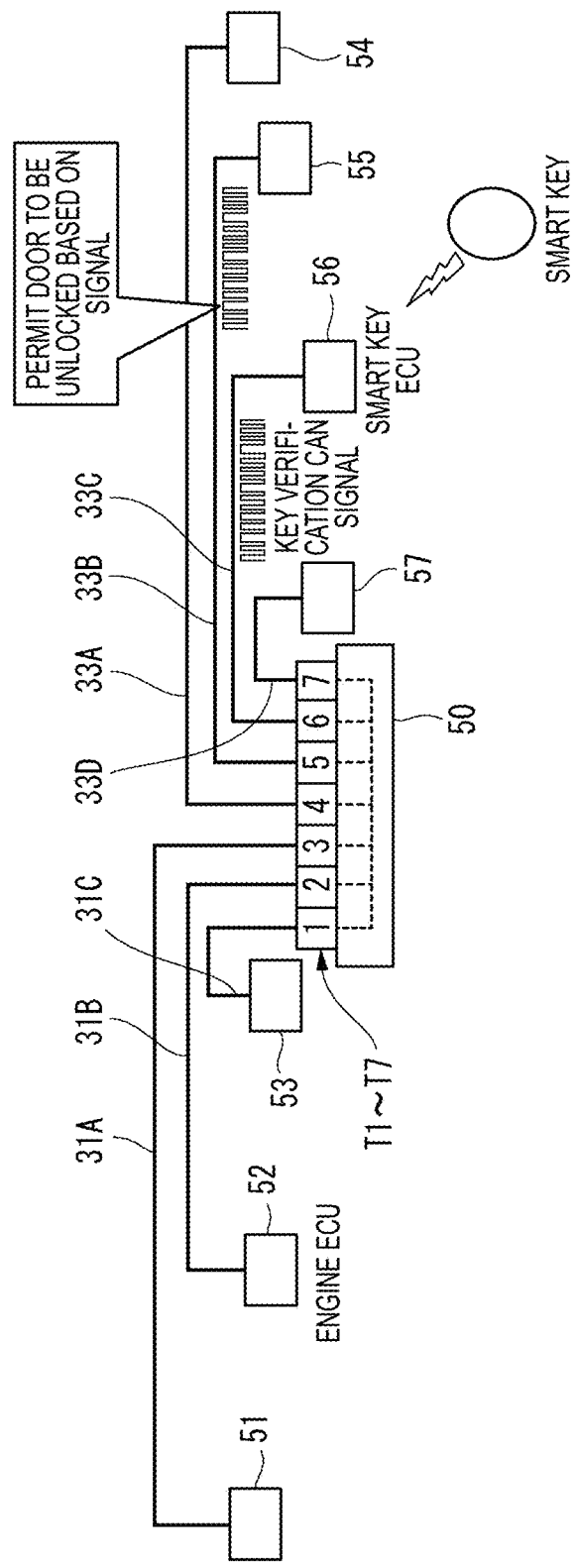
FIG. 6 is a block diagram showing a configuration example of the communication network using a joint connector.
Figure 7:
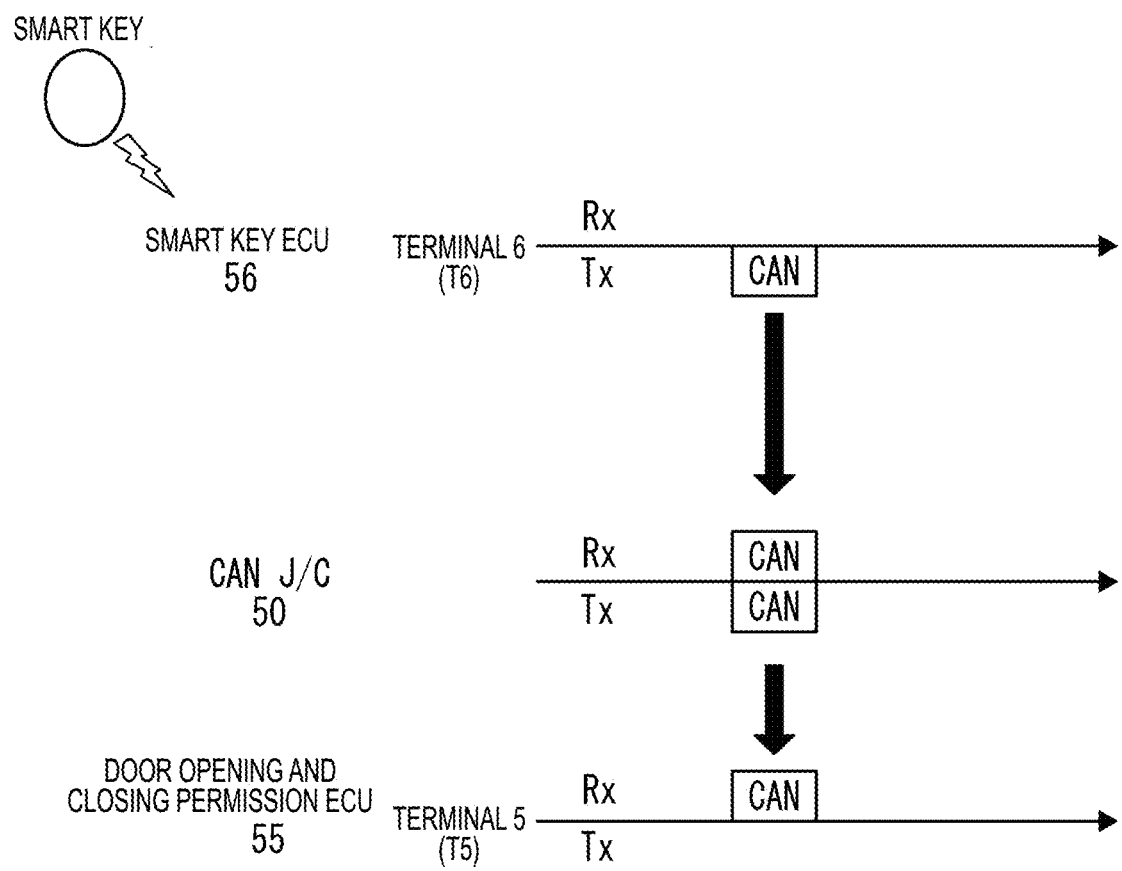
FIG. 7 is a time chart showing an example of a communication operation in the communication network in FIG. 6.

FIG. 6 is a block diagram showing the configuration example of the communication network using the joint connector. FIG. 7 is a time chart showing an example of a communication operation in the communication network in FIG. 6.

In the communication network in FIG. 6, a joint connector 50 including the seven terminals T1 to T7 is provided at the connection position Pc1, similarly to the function substitution unit 40. The electric circuits of the seven terminals T1 to T7 are connected in common inside the joint connector 50. Accordingly, for example, the CAN signal received from the terminal T1 passes through the inside of the joint connector 50 and is output to each of the other terminals T2 to T7.

In the example in FIG. 6, ECUs 51, 52, and 53 are in the engine room 10a, and ECUs 54, 55, 56, and 57 are on the vehicle compartment 10b side. The ECU 52 has an engine control function, the ECU 55 has a door opening and closing permission function, and the ECU 56 has a function of receiving and processing a wireless signal from an authorized smart key.

The ECU 51 is connected to the terminal T3 of the joint connector 50 via a CAN bus 31A, the ECU 52 is connected to the terminal T2 of the joint connector 50 via a CAN bus 31B, and the ECU 53 is connected to the terminal T1 of the joint connector 50 via a CAN bus 31C. The ECU 54 is connected to the terminal T4 of the joint connector 50 via a CAN bus 33A, the ECU 55 is connected to the terminal T5 of the joint connector 50 via a CAN bus 33B, the ECU 56 is connected to the terminal T6 of the joint connector 50 via a CAN bus 33C, and the ECU 57 is connected to the terminal T7 of the joint connector 50 via a CAN bus 33D.

As shown in FIG. 6, when the user brings the authorized smart key close to the ECU 56, the ECU 56 receives a wireless signal of the smart key and verifies the key. Then, the ECU 56 sends a CAN signal indicating the verification result to the CAN bus 33C. The CAN signal sent to the CAN bus 33C is input to the joint connector 50 from the terminal T6, passes through the inside of the connector, and is output to the other terminals T1 to T5 and T7.

In this case, the CAN signal sent from the ECU 56 is input to the ECU 55 via the terminal T5 of the joint connector 50 and the CAN bus 33B. Therefore, the ECU 55 checks the verification result of the smart key using the CAN signal output from the ECU 56, and permits unlocking of the door 10c.

That is, as shown in FIG. 7, the wireless signal of the authorized smart key is received by the ECU 56, and the ECU 56 supplies the verification result as a CAN transmission signal (Tx) to the terminal T6 of the joint connector 50. The CAN signal sent from the ECU 56 is input as a reception signal (Rx) to the terminal T6 of the joint connector 50, passes through the inside of the joint connector 50, and is output as it is as a transmission signal from the terminal T5. The ECU 55 acquires the CAN signal sent from the terminal T5 of the joint connector 50 as a reception signal.

<Case of Unauthorized Intrusion>

Figure 8:
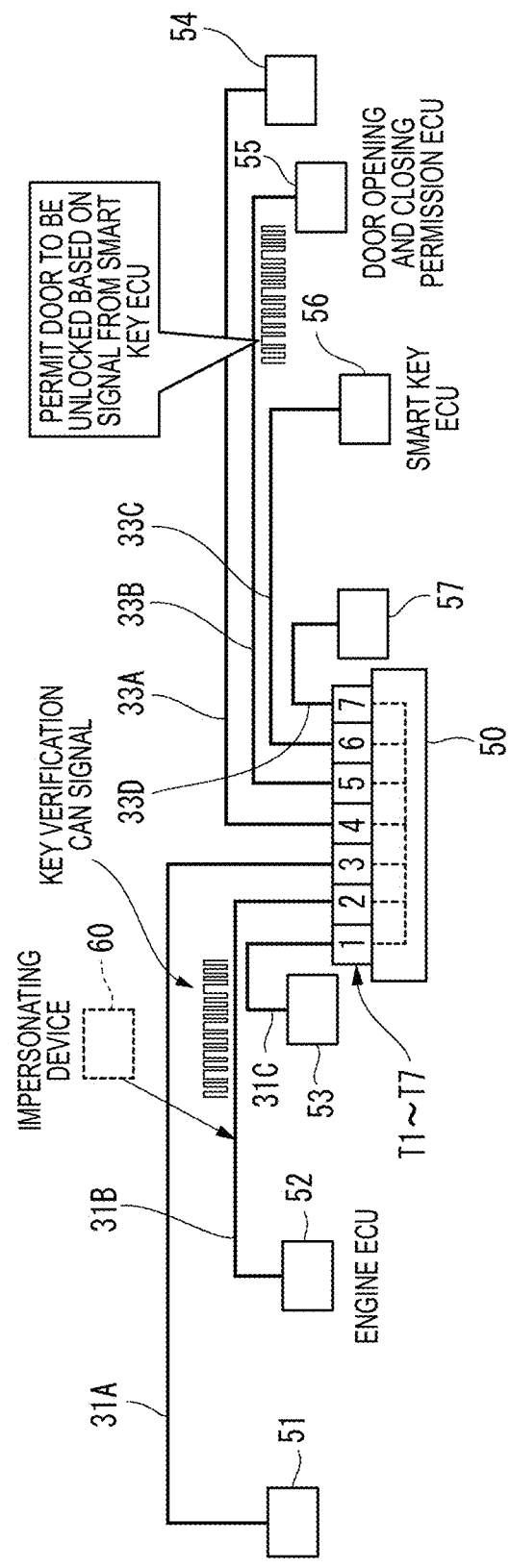
FIG. 8 is a block diagram showing a configuration example of the communication network using the joint connector.
Figure 9:
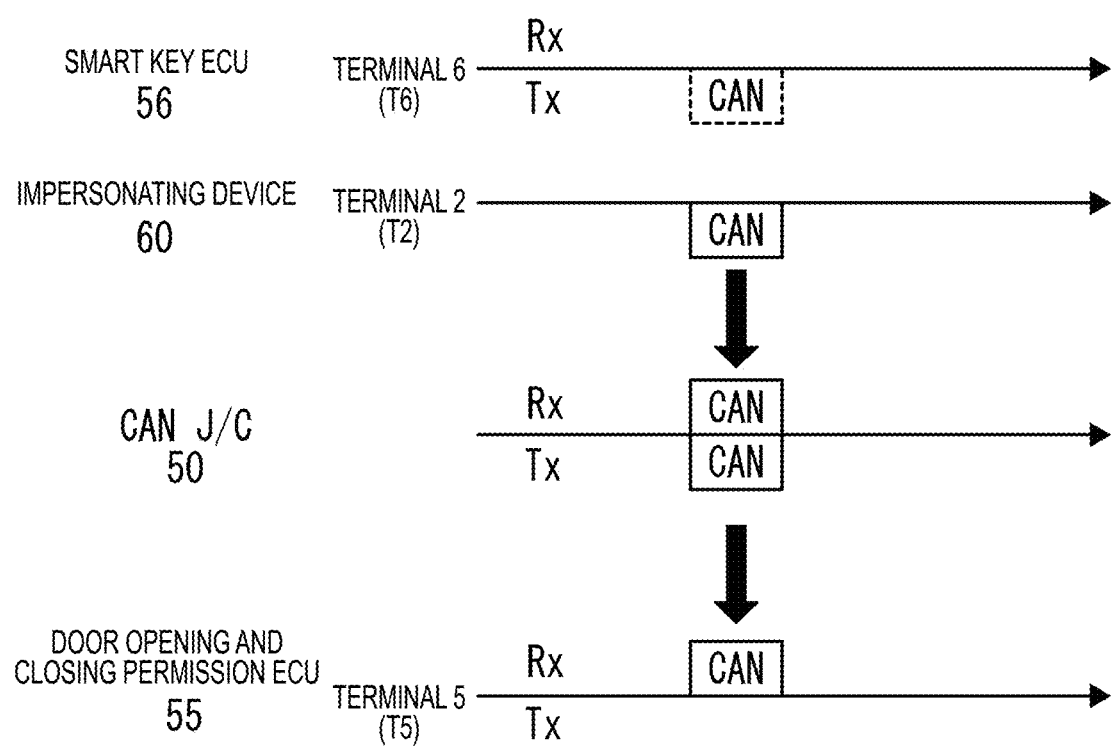
FIG. 9 is a time chart showing an example of a communication operation in the communication network in FIG. 8.

FIG. 8 is a block diagram showing the configuration example of the communication network using the joint connector. FIG. 9 is a time chart showing an example of a communication operation in the communication network in FIG. 8.

In the configuration shown in FIG. 8, a case is assumed in which no authorized smart key is present and instead an unauthorized impersonating device 60 is illegally connected to the CAN bus 31B. Other configurations are the same as those in FIG. 6.

That is, since the CAN bus 31B in FIG. 8 is routed in a state of being exposed in the engine room 10a, even when the door 10c is in a state of being locked, an intruder can attach the impersonating device 60 to the CAN bus 31B of the vehicle 10 in the stop state.

In this case, the impersonating device 60 impersonates the ECU 56 and sends an impersonated (fake) CAN signal to the CAN bus 31B. The impersonated CAN signal is crafted to almost match the CAN signal that the ECU 56 outputs when receiving a signal from the authorized smart key.

The impersonated CAN signal sent by the impersonating device 60 is received from the CAN bus 31B to the terminal T2 of the joint connector 50, passes through the inside of the joint connector 50 as it is, and is output from the terminal T5. Therefore, the impersonated CAN signal is input to the ECU 55 via the CAN bus 33B, causing the ECU 55 to malfunction. That is, even though no authorized smart key is present, the ECU 55 accepts a signal from the impersonating device 60 and permits unlocking of the door 10c.

That is, as shown in FIG. 9, since the ECU 56 does not receive the wireless signal from the authorized smart key, the ECU 56 does not transmit the authorized CAN signal to the terminal T6 of the joint connector 50, but a fake CAN signal sent from the impersonating device 60 appears at the terminal T2 of the joint connector 50. Since the fake CAN signal passes through the inside of the joint connector 50 and is output from the terminal T5, the ECU 55 receives the fake CAN signal.

Then, when the fake CAN signal substantially matches the authorized CAN signal, impersonating cannot be detected, and unlocking of the door 10c is permitted. As a result, it is also possible for an intruder to illegally open the door 10c, get into the vehicle 10, and start the engine.

<Case of Communication Network of On-Vehicle Communication Line Connection Apparatus According to Embodiment>

<Case of Normal Operation>

Figure 10:
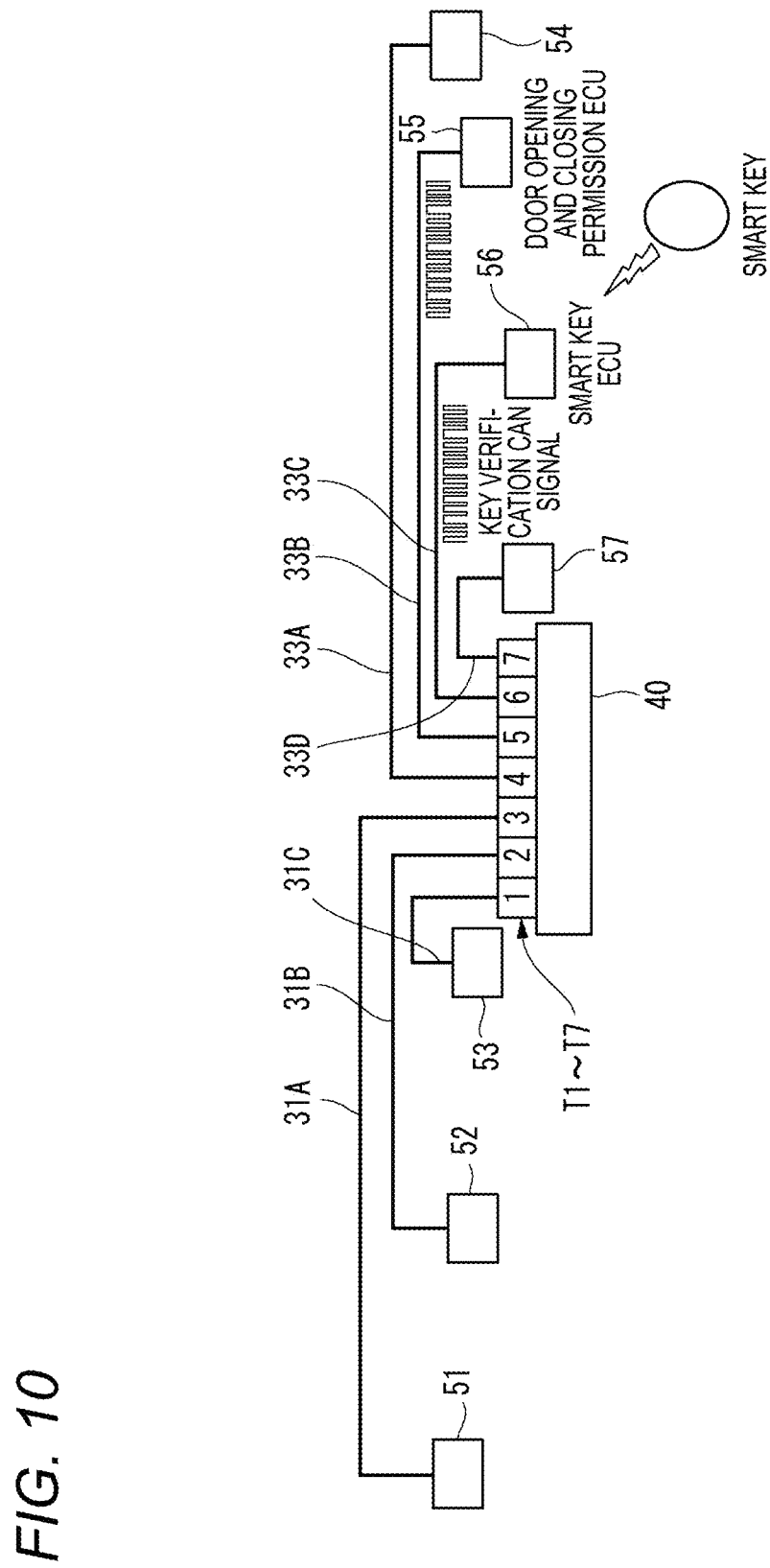
FIG. 10 is a block diagram showing a configuration example of the communication network in which the function substitution unit is connected instead of the joint connector.
Figure 11:
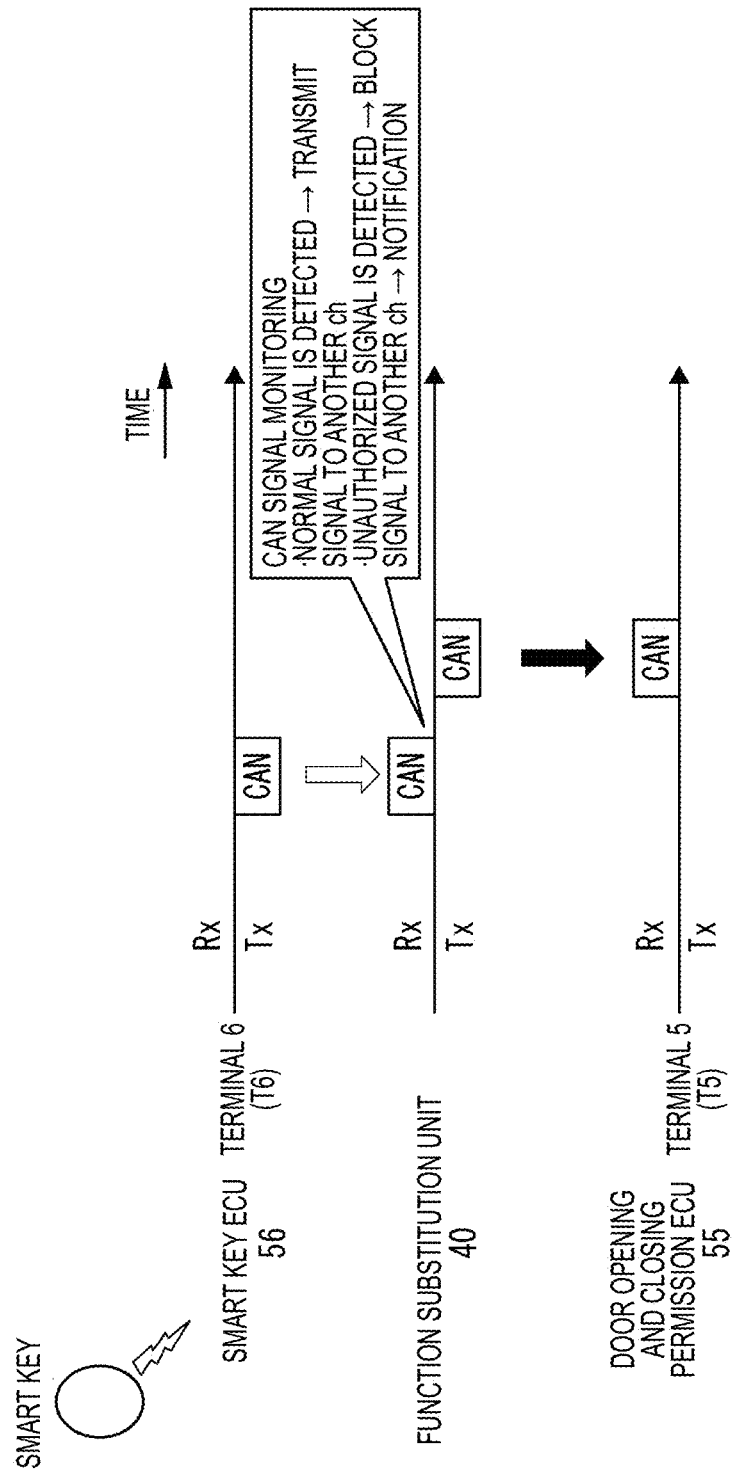
FIG. 11 is a time chart showing an example of a communication operation in the communication network in FIG. 10.

FIG. 10 is a block diagram showing a configuration example of the communication network in which the function substitution unit 40 is connected instead of the joint connector. FIG. 11 is a time chart showing an example of a communication operation in the communication network in FIG. 10.

The configuration of the communication network in FIG. 10 is the same as that in FIG. 6 except that the function substitution unit 40 is connected instead of the joint connector 50.

In the example in FIG. 10, the ECUs 51, 52, and 53 are in the engine room 10a, and the ECUs 54, 55, 56, and 57 are on the vehicle compartment 10b side. The ECU 52 has an engine control function, the ECU 55 has a door opening and closing permission function, and the ECU 56 has a function of receiving and processing a wireless signal from an authorized smart key.

The ECU 51 is connected to the terminal T3 of the function substitution unit 40 via the CAN bus 31A, the ECU 52 is connected to the terminal T2 of the function substitution unit 40 via the CAN bus 31B, and the ECU 53 is connected to the terminal T1 of the function substitution unit 40 via the CAN bus 31C. The ECU 54 is connected to the terminal T4 of the function substitution unit 40 via the CAN bus 33A, the ECU 55 is connected to the terminal T5 of the function substitution unit 40 via the CAN bus 33B, the ECU 56 is connected to the terminal T6 of the function substitution unit 40 via the CAN bus 33C, and the ECU 57 is connected to the terminal T7 of the function substitution unit 40 via the CAN bus 33D.

The CAN buses 31A, 31B, and 31C are routed in the engine room 10a, and the terminals T1 to T3 of the function substitution unit 40 are classified into the A system SA. The CAN buses 33A, 33B, 33C, and 33D are routed in a manner of not passing through the engine room 10a, and the terminals T4 to T7 of the function substitution unit 40 are classified into the B system SB.

As shown in FIG. 10, when the user brings the authorized smart key close to the ECU 56, the ECU 56 receives the wireless signal of the smart key and verifies the key. Then, the ECU 56 sends the CAN signal indicating the verification result to the CAN bus 33C. The CAN signal sent to the CAN bus 33C is input to the function substitution unit 40 from the terminal T6.

Here, since the terminal T6 is assigned to the B system SB side, the microcomputer 41 of the function substitution unit 40 can recognize the CAN signal input to the terminal T6 as an authorized signal. Therefore, the function substitution unit 40 relays the CAN signal input to the terminal T6 by the CAN transmission and reception unit 41a (S17), and sends the CAN signal to the terminal T5.

Therefore, the same CAN signal as the CAN signal sent from the ECU 56 is input to the ECU 55 via the terminal T5 of the function substitution unit 40 and the CAN bus 33B. Therefore, the ECU 55 checks the verification result of the smart key using the CAN signal output from the ECU 56, and permits unlocking of the door 10c.

That is, as shown in FIG. 11, the wireless signal of the authorized smart key is received by the ECU 56, and the ECU 56 supplies the verification result as the CAN transmission signal (Tx) to the terminal T6 of the function substitution unit 40. The function substitution unit 40 monitors the CAN signal received from the terminal T6 and distinguishes between a normal signal and an unauthorized signal.

When the normal signal is input to the terminal T6, the CAN signal relayed inside the function substitution unit 40 is sent to a channel other than the terminal T6, that is, all or part of the terminals T1 to T5 and T7.

At the time of this relay, a delay occurs due to the signal processing in the function substitution unit 40. Therefore, the timing of the CAN signal sent to the terminal T5 is slightly delayed with respect to the CAN signal input to the terminal T6 as shown in FIG. 11. However, it is possible to shorten the delay time by reducing the processing load inside the function substitution unit 40. For example, the delay can be reduced by limiting the monitoring target of the CAN signal to only a part such as the ID field of the signal frame.

The ECU 55 acquires the CAN signal sent from the terminal T5 of the function substitution unit 40 as a reception signal and permits unlocking of the door 10c.

<Case of Unauthorized Intrusion>

Figure 12:
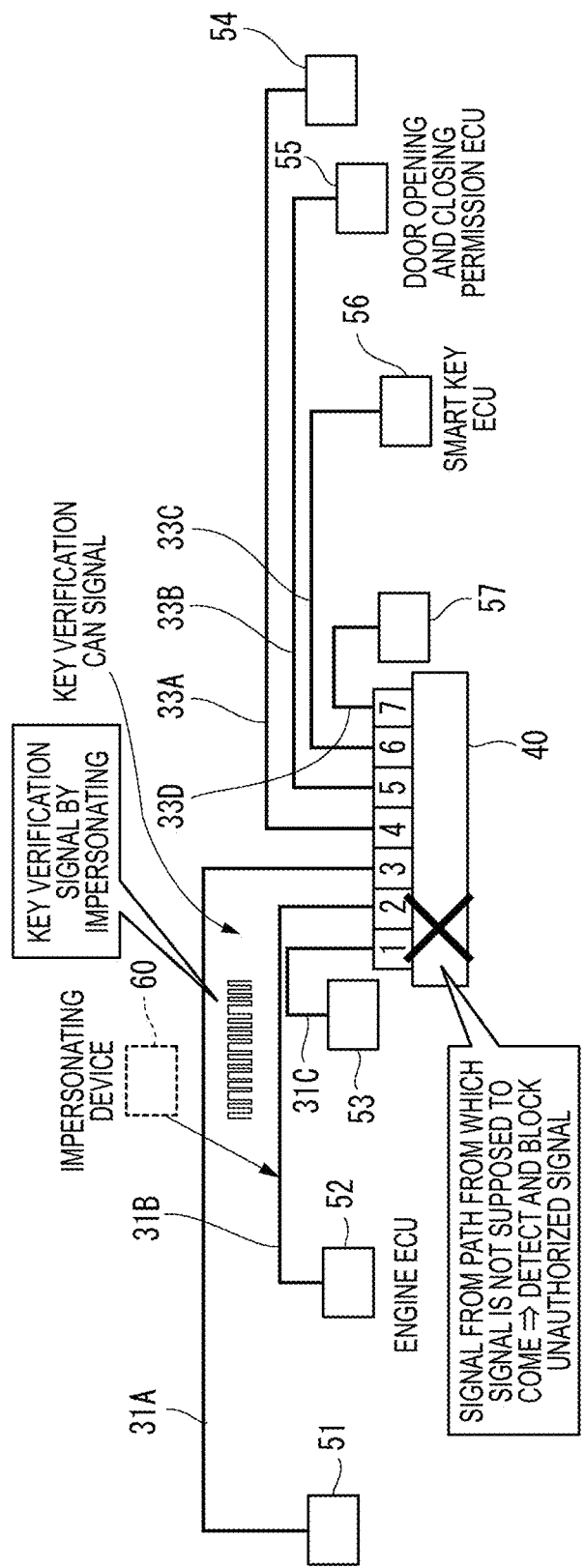
FIG. 12 is a block diagram showing a configuration example of the communication network in which the function substitution unit is connected instead of the joint connector.
Figure 13:
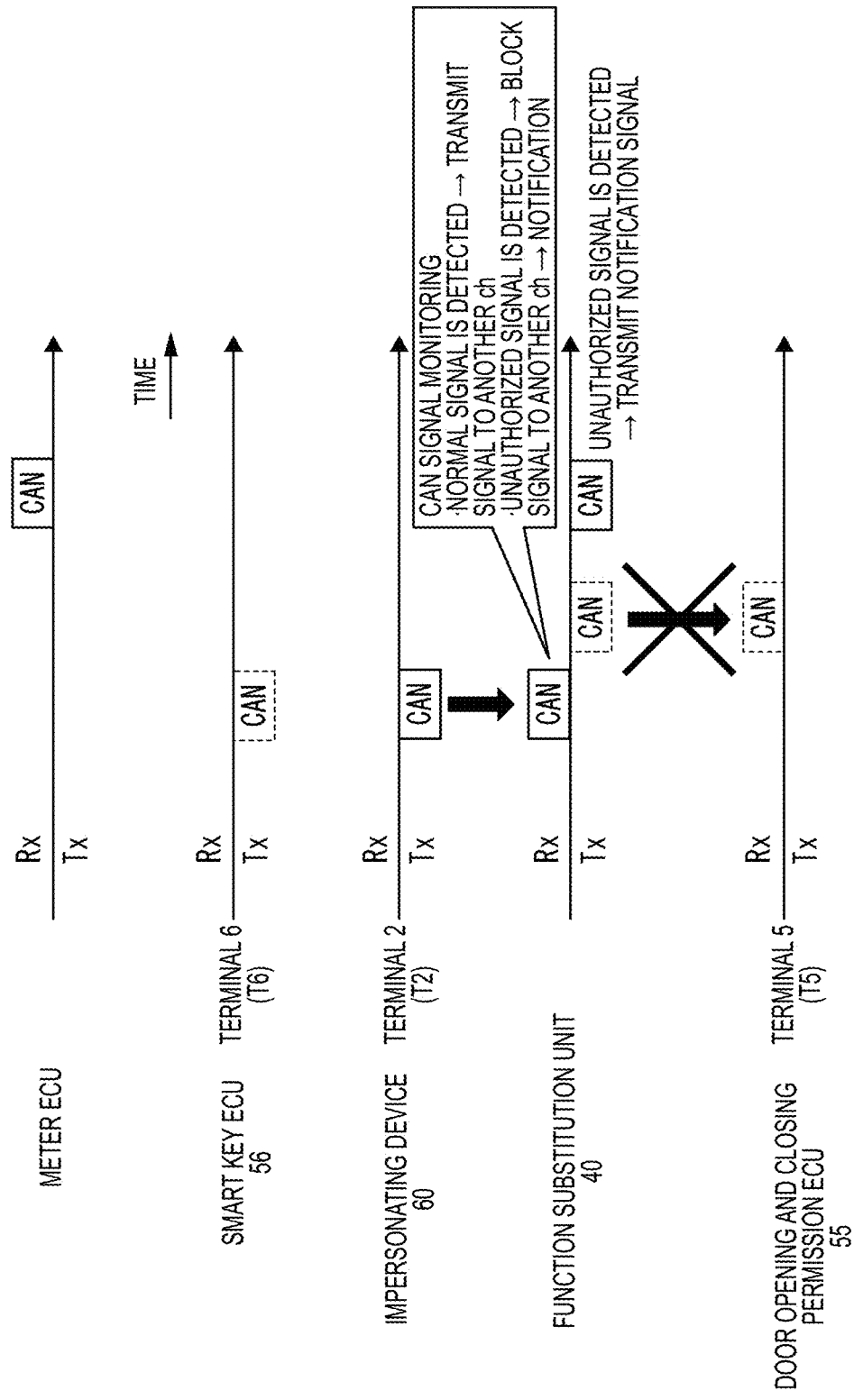
FIG. 13 is a time chart showing an example of a communication operation in the communication network in FIG. 12.

FIG. 12 is a block diagram showing a configuration example of the communication network in which the function substitution unit 40 is connected instead of the joint connector. FIG. 13 is a time chart showing an example of a communication operation in the communication network in FIG. 12.

In the configuration shown in FIG. 12, a case is assumed in which no authorized smart key is present and instead the unauthorized impersonating device 60 is illegally connected to the CAN bus 31B. Other configurations are the same as those in FIG. 10.

That is, since the CAN bus 31B in FIG. 12 is routed in a state of being exposed in the engine room 10a, even when the door 10c is in a state of being locked, an intruder can attach the impersonating device 60 to the CAN bus 31B of the vehicle 10 in the stop state.

In this case, the impersonating device 60 impersonates the ECU 56 and sends an impersonated (fake) CAN signal to the CAN bus 31B. The impersonated CAN signal is crafted to almost match the CAN signal that the ECU 56 outputs when receiving a signal from the authorized smart key.

The impersonated CAN signal sent by the impersonating device 60 is received from the CAN bus 31B to the terminal T2 of the function substitution unit 40.

The CAN signal monitoring unit 41b of the function substitution unit 40 receives and monitors the CAN signal input to the terminal T2. The number of the terminal T2 that receives the CAN signal and the system (SA) of the wire harness assigned to the terminal T2 are recognized (S13 and S14).

Here, the impersonated CAN signal sent by the impersonating device 60 relates to verification of the smart key. However, the authorized ECU 56 that processes the signal of the smart key is present in the vehicle compartment 10b due to the specification of the vehicle 10, and sends the authorized CAN signal to the terminal T6 belonging to the B system SB. Therefore, the CAN signal monitoring unit 41b of the function substitution unit 40 detects that the CAN signal received from the engine room 10a side through an impossible path is received at the terminal T2. Therefore, the unauthorized signal detection unit 41c determines that the CAN signal is an unauthorized signal, and the signal blocking unit 41d blocks this fake CAN signal inside the function substitution unit 40. Therefore, the impersonated CAN signal sent by the impersonating device 60 does not reach the ECU 55, and the locked state of the door 10c is maintained.

The operation shown in FIG. 13 will be described. In the situation in FIG. 13, the authorized smart key is not present in the vicinity of the ECU 56, and the ECU 56 does not send the CAN signal. That is, the authorized CAN signal is not input to the terminal T6 of the function substitution unit 40.

On the other hand, the impersonating device 60 sends the impersonated CAN signal to the ECU 56. The impersonated CAN signal is received from the terminal T2 to the function substitution unit 40. The CAN signal monitoring unit 41b in the function substitution unit 40 confirms that a CAN signal representing verification of the smart key or the like is received from an impossible path, and the unauthorized signal detection unit 41c detects this signal as an unauthorized signal.

When the unauthorized signal detection unit 41c detects the unauthorized signal, the signal blocking unit 41d blocks the unauthorized signal. Therefore, the fake CAN signal sent from the impersonating device 60 is not output through the function substitution unit 40, and the ECU 55 does not permit unlocking of the door 10c. The notification unit 41e notifies, using the CAN signal, the upper meter ECU of information indicating that an unauthorized signal is detected.

The meter ECU displays information indicating unauthorized intrusion based on the information notified from the function substitution unit 40. The meter ECU controls a predetermined security alarm to sound. Further, when the vehicle 10 is managed at a predetermined data center or the like, a notification is sent from the meter ECU to the data center to notify the data center of the occurrence of an abnormality. When the smartphone of the user is registered in advance, the occurrence of an abnormality is notified from the meter ECU to the smartphone of the user, or from the data center to the smartphone of the user.

As described above, in the on-vehicle communication line connection apparatus according to the embodiment, the function substitution unit 40 provided at the connection position Pc1 in the entire wire harness can distinguish the unauthorized CAN signal entering from the region of the engine room 10a via the wire harness 31 from the authorized CAN signal received from the region in the vehicle compartment 10b via the wire harnesses 33 to 36. Therefore, when the impersonating device 60 is connected to the inside of the engine room 10a by an intruder, the attack from the impersonating device 60 can be automatically detected and blocked by the function substitution unit 40.

When the function substitution unit 40 is connected to the wire harness, the CAN signals are output after being relayed inside the function substitution unit 40. Therefore, a signal delay occurs due to the relay. However, as in the processing shown in FIG. 5, by limiting the monitoring of the CAN signal to only when the vehicle is stopped, it is possible to minimize the signal delay occurring during the traveling of the vehicle.

Vehicle theft usually occurs when the vehicle is stopped, and is caused by an attack from the impersonating device 60 connected to the wire harness 31 or the like in the region of the engine room 10a that is exposed to the outside even in the locked state. Therefore, the attack can be avoided by limiting monitoring of the CAN signal to only when the vehicle is stopped.

The monitoring target of the CAN signal when the vehicle is stopped is limited to only a part (the ID field or the like) of the signal frame, so that the delay time can be reduced even when the vehicle is stopped.

When the function substitution unit 40 is connected to the wire harness, the present CAN bus is used as it is. Therefore, it is possible to take an anti-theft measure in the vehicle 10 without adding other special communication lines. Therefore, it is possible to minimize the operation such as routing of a wire harness necessary for adding an anti-theft measure function to the present vehicle. When a new vehicle wire harness having the anti-theft measure function is designed, there is almost no difference in configuration from the present wire harness, and thus the burden of the design operation is reduced. A change in the manufacturing process of the wire harness can also be kept to a minimum.

When the function substitution unit 40 is connected to the wire harness, even in the communication network of the CAN bus to which the communication lines of the plurality of systems are connected in common, the signals can be distinguished for each system in the function substitution unit 40. Therefore, failure detection of various on-vehicle devices mounted on the vehicle 10 becomes easy. When various optional devices are connected to the CAN bus, the connection operation becomes easy, and a safety measure suitable for the characteristics of each device can be handled only by updating the software in the function substitution unit 40.

The characteristic matters relating to the on-vehicle communication line connection apparatus described above will be briefly summarized and listed in the following [1] to [5].

[1] An on-vehicle communication line connection apparatus including:
  a first common communication line (wire harnesses 33 to 36) routed in a first region (a vehicle compartment 10b) on a vehicle (10) that is physically difficult to access by an unauthorized external device;
  a second common communication line (a wire harness 31) at least partially routed in a second region (an engine room 10a) on the vehicle that is physically easy to access by the unauthorized external device;
  a common connector portion (a connection position Pc1 and terminals T1 to T3) configured to physically connect the first common communication line and the second common communication line;
  a first connection unit (terminals T4 to T6) configured to connect one or more first on-vehicle devices provided in the first region and the first common communication line;

an upper connection unit (a terminal T7) configured to connect the first common communication line and an upper management unit (a central gateway 11) configured to manage communication in a system higher than the first common communication line; and a substitute management unit (a function substitution unit 40) provided inside or near the common connector portion and configured to monitor at least unauthorized communication in a direction from the second common communication line toward the first common communication line.

According to the on-vehicle communication line connection apparatus having the configuration in [1] described above, since the substitute management unit can distinguish the signal in the first region and the signal in the second region on the vehicle using the present communication line, it is possible to identify an unauthorized signal entering from the second region without adding a special communication line. Therefore, it is easy to take a measure to prevent vehicle theft. That is, in the prevent vehicle, it is only necessary to attach the function substitution unit 40 to the present wire harness instead of the joint connector 50. When a vehicle theft prevention measure is taken for a new vehicle, there is almost no need to change the configuration (particularly the number of communication lines) of the wire harness. Therefore, the wire harness can be easily redesigned, and only a minimal change in the manufacturing process is required.

[2] The on-vehicle communication line connection apparatus according to [1] described above,
in which the substitute management unit (the microcomputer 41) identifies at least whether the vehicle is in a stop state (S11), and only when the vehicle is in the stop state, monitors communication received from the second common communication line to identify presence or absence of unauthorized communication (S12 to S15).

According to the on-vehicle communication line connection apparatus having the configuration in [2] described above, when the vehicle is traveling, the monitoring processing of the unauthorized signal becomes unnecessary. Therefore, it is easy to minimize the delay occurring in the communication signal, and it is possible to prevent the responsiveness of the on-vehicle system from deteriorating when the vehicle is traveling. Since vehicle theft occurs when the vehicle is stopped, it is considered that no problem occurs even if monitoring of the unauthorized signal is omitted when the vehicle is traveling.

[3] The on-vehicle communication line connection apparatus according to [1] or [2] described above,
in which at least a part of the second common communication line is routed in an engine room (10a) of the vehicle.

According to the on-vehicle communication line connection apparatus having the configuration in [3] described above, when an unauthorized device is attached to the inside of the engine room by an intruder, an unauthorized signal sent from the unauthorized device and a correct signal sent from an authorized device in the vehicle compartment can be distinguished from each other. Therefore, damage caused by impersonating of the unauthorized device is prevented.

[4] The on-vehicle communication line connection apparatus according to any one of [1] to [3] described above,
in which the substitute management unit has a blocking function (a signal blocking unit 41d) of blocking, from the first common communication line, a communication signal received from the second common communication line when unauthorized communication is detected by monitoring the communication signal.

According to the on-vehicle communication line connection apparatus having the configuration in [4] described above, it is possible to prevent an unauthorized signal generated from an unauthorized device from passing through the substitute management unit and being transmitted to the downstream side. Therefore, it is not necessary to add a special safety measure function to the on-vehicle device on the downstream side.

[5] The on-vehicle communication line connection apparatus according to any one of [1] to [4] described above,
in which, when a plurality of communication lines of systems belonging to the second common communication line are respectively connected to a plurality of terminals of the common connector portion, the substitute management unit identifies presence or absence of unauthorized communication by comparing an identification condition (an unauthorized condition table TB1) assigned to each terminal in advance with a state of a communication signal appearing at the terminal (S13 to S15).

According to the on-vehicle communication line connection apparatus having the configuration in [5] described above, it is possible to identify whether unauthorized communication is executed under independent conditions for each terminal. Therefore, it is easy to improve the accuracy of unauthorized signal determination by considering the characteristics (the type of signal, the timing, and the like) of the authorized on-vehicle device connected to the terminal.

Note that, the present disclosure is not limited to the embodiments described above and can be appropriately modified, improved and the like. In addition, the materials, the shapes, the sizes, the numbers, the arrangement positions, and the like of the components in the embodiments described above are freely selected and are not limited as long as the present invention can be implemented.

Note that the present application is based on a Japanese Patent Application (No. 2022-025049) filed on Feb. 21, 2022, the contents of which are incorporated herein by reference.

REFERENCE SIGNS LIST

10: vehicle
10a: engine room
10b: vehicle compartment
10c: door
11: central gateway
12, 13: CAN bus
14A, 14B, 14C, 14D: ECU
15A, 15B, 15C: ECU
21, 22, 23, 24, 25, 26, 27: on-vehicle device
31, 32, 33, 34, 35, 36, 37, 38: wire harness
31A, 31B, 31C: CAN bus
33A, 33B, 33C, 33D: CAN bus
40: function substitution unit
41: microcomputer
41a: CAN transmission and reception unit
41b: CAN signal monitoring unit
41c: unauthorized signal detection unit
41d: signal blocking unit
41e: notification unit
42, 43, 44, 45, 46, 47, 48: interface
50: joint connector
51, 52, 53, 54, 55, 56, 57: ECU 60: impersonating device
Pc1, Pc2: connection position
SA: A system
SB: B system
T1, T2, T3, T4, T5, T6, T7, T9: terminal
TB1: unauthorized condition table

What is claimed is:

1. An on-vehicle communication line connection apparatus comprising:
    a first common communication line that is routed in a first region on a vehicle, the first region being in a physically locked state that is configured to restrict access by an unauthorized external device;
    a second common communication line that is at least partially routed in a second region on the vehicle, the second region being physically accessible by an unauthorized external device;
    a common connector portion that physically connects the first common communication line and the second common communication line;
    a first connection unit includes a plurality of first terminals that connect one or more first on-vehicle devices provided in the first region and the first common communication line;
    an upper connection terminal that connects the first common communication line and an upper management unit, the upper management unit managing communication in a system different from the first common communication line; and
    a substitute management unit controller that is provided inside or adjacent to the common connector portion and monitors at least unauthorized communication in a direction from the second common communication line toward the first common communication line,
    wherein the substitute management controller identifies at least whether or not the vehicle is in a stop state, and
    only when the vehicle is in the stop state, the substitute management controller monitors communication received from the second common communication line to identify presence or absence of unauthorized communication.

2. The on-vehicle communication line connection apparatus according to claim 1,
    wherein at least a part of the second common communication line is routed in an engine room of the vehicle.

3. The on-vehicle communication line connection apparatus according to claim 1,
    wherein the substitute management controller has a blocking function of blocking, from the first common communication line, a communication signal received from the second common communication line when unauthorized communication is detected by monitoring the communication signal.

4. The on-vehicle communication line connection apparatus according to claim 1,
    wherein, when a plurality of communication lines of systems belonging to the second common communication line are respectively connected to a plurality of second terminals of the common connector portion, the substitute management controller identifies presence or absence of unauthorized communication by comparing an identification condition assigned to each of the second terminals in advance with a state of a communication signal appearing at each of the second terminals.

* * * * *